United States Patent [19]

Patterson

[11] Patent Number: 5,305,027
[45] Date of Patent: Apr. 19, 1994

[54] METHOD AND APPARATUS FOR ENHANCED VISUAL TRAINING

[76] Inventor: Kip E. Patterson, 1030 Holly St., Lake Charles, La. 70601

[21] Appl. No.: 826,973

[22] Filed: Jan. 28, 1992

[51] Int. Cl.⁵ .............................................. G02C 7/10
[52] U.S. Cl. ..................................... 351/44; 351/163; 351/203
[58] Field of Search ........................ 351/44, 45, 203, 46, 351/47, 48, 163, 164, 165; 273/183.1, 187.6

[56] References Cited

U.S. PATENT DOCUMENTS

| | | | |
|---|---|---|---|
| 1,247,853 | 11/1917 | McWenie | 351/45 |
| 1,584,041 | 4/1925 | Shaver | 351/47 |
| 1,637,406 | 8/1927 | Brumder | 351/45 |
| 2,045,399 | 6/1936 | McMurdo | 273/183 |
| 2,207,411 | 7/1940 | Pierce | 351/165 |
| 2,511,776 | 10/1947 | Kelly | 351/47 |
| 3,228,696 | 1/1966 | Hull | 273/183 |
| 3,268,228 | 8/1966 | Novack | 273/183 |
| 3,487,549 | 1/1970 | Engesser | 273/183 |
| 4,229,082 | 10/1980 | Carreau et al. | 351/44 |
| 4,531,743 | 7/1985 | Lott | 273/183 |
| 4,542,964 | 9/1985 | Gilson et al. | 351/44 |
| 4,852,882 | 8/1989 | Otsuka et al. | 273/183 |
| 4,911,546 | 3/1990 | Cohen | 351/44 |
| 4,961,640 | 10/1990 | Irlen | 351/44 |

FOREIGN PATENT DOCUMENTS 52-45943 4/1977 Japan ...................................... 351/44

OTHER PUBLICATIONS

The optican Oct. 28, 1949 "Spectacles for Colour Blind Motorists" Mr. Schmidt.
The optican Aug. 19, 1949 "Special Lenses for Color-Blind Drivers".

Primary Examiner—Bruce Y. Arnold
Assistant Examiner—Hung Xuan Dang

[57] ABSTRACT

A vision training device, useful for improving hand-eye coordination activities, takes the form of eyewear having two red colored, translucent lenses, each lens containing a clear target sight positioned and dimensioned to allow a trainee to focus the image of an object onto the foveal vision areas of his eyes through the apertures while simultaneously stimulating the rod vision of the eye by exposure to light in the red spectrum.

15 Claims, 1 Drawing Sheet

METHOD AND APPARATUS FOR ENHANCED VISUAL TRAINING

FIELD OF THE INVENTION

The present invention relates to a vision training device in the form of eyewear and its use to provide visual skill and hand-eye coordination exercise and training.

BACKGROUND OF THE INVENTION

In many sports activities, such as golfing, basketball shooting, football passing, archery, shooting, bowling and billiard; it is of primary importance to maintain ones head motionless with the eyes being fixed upon a target.

It is known in the art to use sight apertures on eye glasses in an attempt to steady the head during a golf swing. For example, U.S. Pat. No. 3,228,696, to Hull, positions a target sight on each lens in a pair of glasses to assist in maintaining ones head motionless during a golf swing.

OBJECTS AND SUMMARY OF THE INVENTION

It is an object of the present invention to provide an vision training device and methods of using such device that permits the user to improve and develop visual skills and hand-eye coordination.

It is a further object of the present invention to provide an vision training device to focus a trainee's foveal vision while simultaneously shifting ones peripheral vision into an enhanced state of visual perception.

In accordance with the present invention vision training devices in the form of eyeglasses are fabricated by securing translucent optical filters or lenses to an eyeglass frame. The translucent optical filters or lenses block wavelengths in the visible spectrum between 490 to 520 nm, preferably 450 to 550 nm and are reddish in color. Each translucent optical filter or lens has a target sight formed from one or more clear apertures positioned and dimensioned to allow intersecting lines of sight capturing the image of an object to be projected onto the foveal area of the eyes when the eyeglasses are worn by an individual.

The vision training device is worn by an individual during a practice session of a sporting activity for a limited period of time. Upon removal of the vision training device after the practice session, the individual is accorded an enhanced state of visual perception in both the foveal and peripheral areas of sight. This enhanced visual state improves hand-eye coordination during the performance of a similar subsequent sporting activity by the trainee.

BRIEF DESCRIPTIONS OF THE DRAWINGS

DETAILED DESCRIPTION OF THE INVENTION

Figure 1:
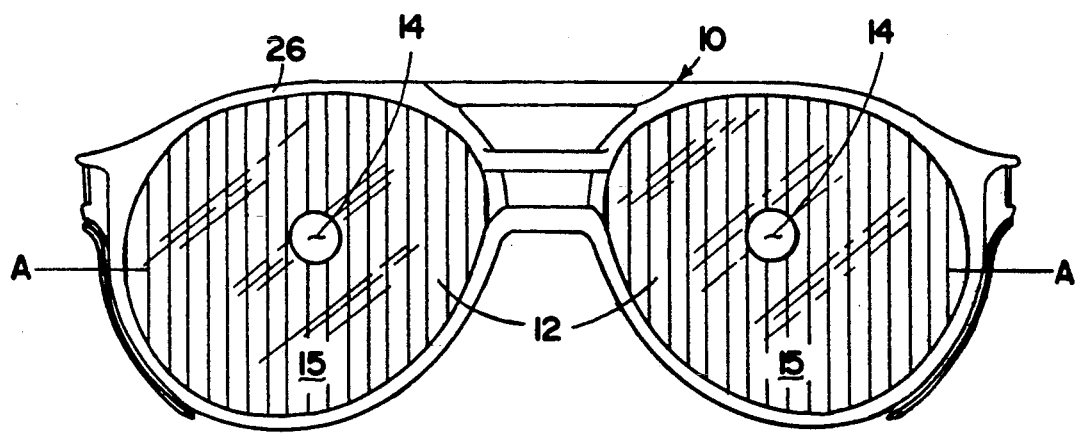
FIG. 1 is a front elevational view of eyeglasses of the present invention in one of its contemplated forms.
Figure 2:
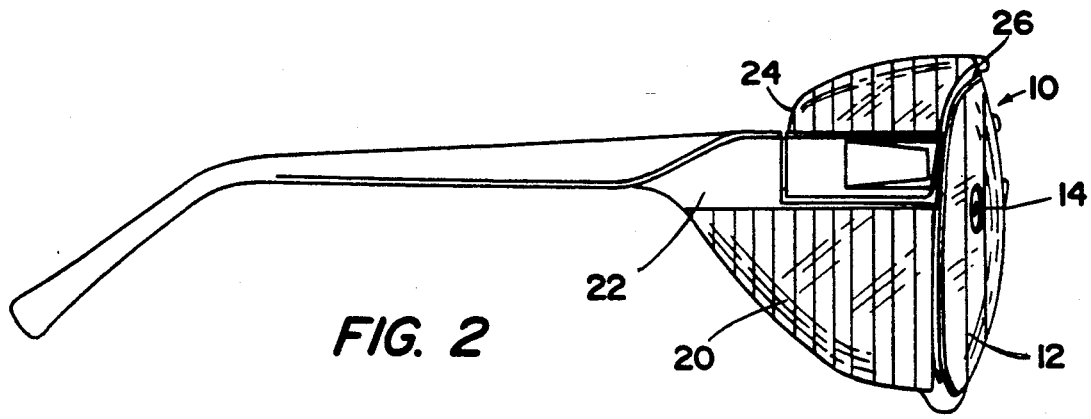
FIG. 2 is a side-elevational view of the eyeglass of FIG. 1.
Figure 3:
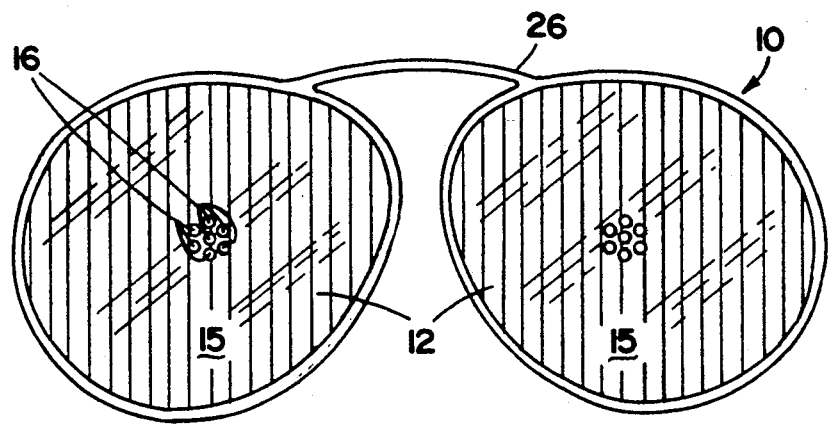
FIG. 3 is a front elevational view of eyeglasses of the present invention in an alternative embodiment of its contemplated form.

Referring to FIGS. 1, 2 and 3 of the accompanying drawing, there is shown a pair of glasses 10 having a pair of optical filters or lenses 12, preferably constructed of glass or plastic, each lens containing a clear target sight in the form of an aperture 14. The apertures are preferably ellipsoidal, most preferably circular and are clear in color. The target sights can consist of one or more holes drilled through the lens or a clear portion of the lens. The remaining lens portions 15 must be translucent and red or reddish in color thereby blocking wavelengths in the visible spectrum between 450 to 550 nm, preferably 490 to 520 nm. The lenses 12 can be tinted red or each lens can be coated with a translucent red coating. Alternatively, each lens can be constructed of corrective or non-corrective clear glass or plastic having an overlay of an adherable flexible, reddish colored, translucent plastic having a target sight on each lens.

The total clear, non-tinted surface area of any suitably shaped target sight is approximately between 0.005 to 0.2 square inches in size, preferably between 0.05 and 0.2 square inches in size. The optimum size of a single apertures 14 on corrective or non-corrective eyeglasses is between about 0.015 to 0.50 inches in diameter for a circular aperture. The apertures are preferably dimensioned to accommodate the viewing of objects observed through the intersecting lines of sight through the two apertures 14. Although it is preferred that the apertures 14 be ellipsoidal, most preferably circular in order to conform with the foveal physiology of the eye, shapes other than ellipsoidal can be utilized if the shape is sufficient to allow transmission of the image of a desired object for a particular activity onto the foveal area of the eye. Other suitable aperture shapes include diamond, square, hexagonal or other polygonal shapes.

A preferred target sight structure is displayed in FIG. 3 in which a plurality of apertures 16 are employed in each lens to actuate foveal vision. These apertures preferably consist of from 5 to 9 ellipsoidal openings, most preferably 7 openings. Each opening, if circular, is preferably sized from 1/64" to ¼" in diameter. When employing a plurality of apertures in each lens the total surface area of the apertures in each lens ranges from 0.005 to 0.2, preferably 0.05 to 0.2 square inches. The apertures 16 are most preferably placed in a hexagonal pattern with a centered positioned opening as displayed in FIG. 3. When a plurality of apertures is used in each lens all apertures for use for foveal activation must be within one inch from the farthest aperture within the same lens.

The target sights are positioned on the lenses 12 in accordance with the physical activity to be conditioned or practiced. In a sporting activity such as golf, in which the head and eyes are slightly lowered to sight the ball, the clear apertures 14 are preferably centered approximately one-half of inch below the centerline (A—A) of lens. The centers of the apertures are typically spaced approximately 2½ to 3 inches apart, thereby conforming to the standard distance between human lines of sight. In sporting activities in which the head is erect or the eyes are directed upward, such as foul shooting in basketball or passing in football, the target sights or apertures are preferably centered along the centerline (A—A) of the lens approximately 2¼ to 3 inches apart. The ideal position of the apertures 14 or 16 allows the trainee to focus his line of sight so that the apertures in each lens appear to blend into a single aperture containing a clear view of the object of concentration.

In an alternative embodiment of the present invention the target sights in the form of apertures 14 or 16 or other discussed shapes are located in an adjustable or removable, flexible, translucent red colored plastic films, such as polyethylene terephthalate or polyvinylacetate, which can adhere to corrective or non-corrective lens surfaces simply by static electrical or Vander Waals forces, or by a clear low tack adhesive. When using the vision training device of FIG. 1 for a particular athletic event, the trainee can adjust these plastic films so that the object of concentration, whether it be a pool ball, golf ball, basketball basket, etc., is approximately focally centered in each aperture 14 on each lens 12.

It is also desirable in the method of the present invention to have the red tinted lenses "wrap-around" the visual field so as to subject the maximum number of peripheral vision cells or rods to the red tinted portion of the glasses. As such, a preferred embodiment of the invention is shown in FIG. 2, displaying red-tinted side shields 20 attached to each stem 22 of the frame of the glasses and red tinted top shields 24 attached to the top of the frame 26. The individual frame designs of the glasses supporting the lenses can be selected based on fashion, durability and convenience of use.

As previously discussed the vision training device of the present invention is worn during periodic training sessions of specific physical activities requiring hand-eye coordination such as golf, baseball hitting and catching, tennis, bowling, pistol shooting, basketball passing and shooting, archery, and passing and catching a football. The vision training and enhancing device of the present invention when used in these training sessions, mechanically stimulates the foveal vision areas of eyes of the wearer of the image viewed through the aperture in the glasses. Simultaneously, the peripheral or rod vision of the eye is stimulated through exposure to light in the red spectrum. An optical filter appears red in color because the complement of red, namely blue-green, has been subtracted by absorption. It is thus necessary to employ optical filters in the present invention that block wavelengths in the visible spectrum between 450 to 550 nm or preferably between 490 to 520 nm.

The simultaneous activation of foveal and peripheral vision creates a state of enhanced visual perception upon removal of the vision training device, thereby improving hand-eye coordination. This enhanced state of visual perception is obtained by a trainee wearing the vision training device and practicing a physical activity for a short period, such as 10 to 15 minutes. In a typical training session a trainee alternates a 10 to 15 minute training period while using the visual training device with a 15 to 20 minute period of performing the identical physical activity without the use of the visual training device. The use of the visual training device of the present invention is intended to create a reference experience for the trainee. The trainee ultimately uses the visual training device to learn how to see in an enhanced manner. Thus, by training with the present invention an individual undergoes a process of identification and memorization of the enhanced visual perception effect produced by the use of the visual training device. The vision training device can be used in any activity in which there is a desire to increase visual concentration on hand-eye coordination, or to enhance visual-motor performance.

What is claimed is:

1. A vision training device in the form of eyewear useful for hand-eye coordination exercises comprising: a frame, first and second translucent lenses secured to said frame wherein each of said lenses is red in color and has a clear target sight positioned on each lens said clear target sight comprising a plurality of ellipsoidal apertures totally through and entirely surrounded by said translucent red lens.

2. The device according to claim 1, wherein the target sights are ellipsoidal apertures.

3. The device according to claim 2, wherein the apertures are circular having a diameter in the range of 0.015 to 0.50 inches.

4. The device according to claim 1, wherein the plurality of apertures comprises 5 to 9 circular openings.

5. The device according to claim 1, wherein the total area of the target sight in each lens ranges between 0.005 to 0.2 square inches.

6. The device according to claim 1, wherein said Red lenses block wavelengths between 490 to 520 nm.

7. The device according to claim 1, wherein said Red lenses block wavelengths between 450 to 550 nm.

8. The device according to claim 1, wherein said lenses comprise a flexible, red-tinted plastic film adhered to a corrective or non-corrective lens surface.

9. A method of enhancing the hand-eye coordination skills of an individual in a sporting activity comprising having the individual perform the sporting activity for intermittent period of 10 to 15 minutes while wearing the device of claim 1 and stimulating foveal and peripheral vision areas of the eyes of the individual while performing the sporting activity.

10. A vision training device in the form of eyewear useful for hand-eye coordination exercises comprising: a frame, first and second translucent lenses secured to said frame wherein each of said lenses is red in color and has a clear target sight in the form of a plurality of ellipsoidal apertures positioned on each red lens.

11. The device according to claim 10, wherein the apertures are circular having a diameter in the range of 0.015 to 0.50 inches.

12. The device according to claim 10, wherein the plurality of apertures comprises 5 to 9 circular openings.

13. The device according to claim 10, wherein the total area of the target sight in each lens ranges between 0.005 to 0.2 square inches.

14. The device according to claim 10, wherein said Red lenses block wavelengths between 490 to 520 nm.

15. The device according to claim 10, wherein said Red lenses block wavelengths between 450 to 550 nm.

* * * * *